United States Patent [19]

Zahid

[11] 4,102,465

[45] Jul. 25, 1978

[54] LOCKING RING FOR PRESSURE VESSEL AND METHOD OF MAKING THE SAME

[75] Inventor: Abduz Zahid, Los Angeles, Calif.

[73] Assignee: Greer Hydraulics, Inc., Los Angeles, Calif.

[21] Appl. No.: 794,478

[22] Filed: May 6, 1977

[51] Int. Cl.² ............................ F16L 55/04; F16J 15/02
[52] U.S. Cl. ............................................ 220/3; 138/30; 277/235 R
[58] Field of Search ................... 220/3, 378; 277/181, 277/188 A, 235 R, 235; 138/30

[56] References Cited

U.S. PATENT DOCUMENTS

| | | | |
|---|---|---|---|
| 3,316,939 | 5/1967 | Mercier | 277/235 X |
| 3,326,241 | 6/1967 | Mercier | 138/30 |
| 3,675,684 | 7/1972 | Mercier et al. | 138/30 |

Primary Examiner—William Price
Assistant Examiner—Steven M. Pollard
Attorney, Agent, or Firm—Arthur B. Colvin

[57] ABSTRACT

This invention relates to an improved locking ring for supporting the closure plug of a pressure vessel of the type used to store fluid under pressure, and particularly of the type having a deformable partition, such as a bladder. The locking ring is comprised of two relatively foldable segments, the segments being held together by an annular elastomeric component, the device being characterized by the elastomer being molded in situ in an annular groove in the segments, which groove incorporates a non-reentrant mouth portion, whereby the elastomeric component is united to the segments without the necessity for bonding, etc. The invention is further directed to a method of forming the above described locking ring.

3 Claims, 5 Drawing Figures

LOCKING RING FOR PRESSURE VESSEL AND METHOD OF MAKING THE SAME

As conducive to an understanding of the invention, it is to be noted that where a pressure container has an opening or port with a removable closure plug therein, the use of a threaded connection between the parts is undesirable in that the threads may become worn and stripped, with the possibility of the plug blowing out when high pressures are attained in the container. Additionally, a threaded plug could conceivably be removed before substantially all of the pressure is relieved from the container, with the result that when a mechanic disassembles the plug, it may suddenly blow clear of the port of the pressure vessel and cause severe injury.

To overcome such difficulties, there is shown, by way of example, in U.S. Pat. No. 3,733,682 and in certain of the references mentioned in the text thereof, a locking ring adapted to be seated within the oil port of a pressure vessel and utilized as the means for supporting the closure plug.

The closure plug includes a radially directed flange of a size smaller than the oil port to permit insertion therethrough. The locking ring is comprised of a pair of arcuate segments which together form an annulus, the segments being held together by a surrounding ring of elastomer.

The locking ring may be inserted into position by folding the elastomer along a line coincident with the break between the segments, and upon being disposed within the container the released annular elastomeric ring will cause the segments to return to their essentially annular configuration. When the segments are disposed in the pressure vessel they provide an annulus, the inner diameter of which is larger than the outer diameter of the plug but smaller than the diameter of the flange portion of the previously inserted plug, whereby the plug is blocked from removal through the oil port.

A locking ring of the sort noted in the above mentioned United States patent has previously been formed by bonding an already formed elastomeric ring into the groove of the metal segments, or by molding the ring in situ about the segments.

Heretofore, either of the noted operations has required for a permanent junction between the segments and the ring that the interior of the groove be sandblasted and degreased, which operations consume a considerable amount of time as well as increasing the cost of the part.

SUMMARY OF THE INVENTION

The present invention may be summarized as directed to an improved locking ring and method of making the same. The method includes forming a ring having an outwardly facing groove, which groove includes a lip disposed adjacent the mouth of the groove. The ring is thereafter treated in a manner to deform the lip so as partially to close the groove, whereby a mouth portion defining a non-reentrant angle is formed in the groove.

Thereafter the elastomeric composition may be molded in situ over the ring and, by virtue of the non-reentrant nature of the mouth of the groove, a secure connection is formed between the elastomer and the metal without the necessity for sandblasting and degreasing.

After the elastomer is cured, the metal ring may be cut at diametrically opposed positions, the cut being effected completely through the ring but only partially through the elastomer, whereby the desired foldability of the unit is achieved.

It is accordingly an object of the present invention to provide an improved locking ring for supporting a closure plug in the oil port of a pressure vessel.

A further object of the invention is the formation of a locking ring of the type described, which method avoids the necessity for degreasing and cementing to achieve a permanent connection between the elastomer and metal segments.

To attain these objects and such further objects are may appear herein or be hereinafter pointed out, reference is made to the accompanying drawings, forming a part hereof, in which.

Figure 1:
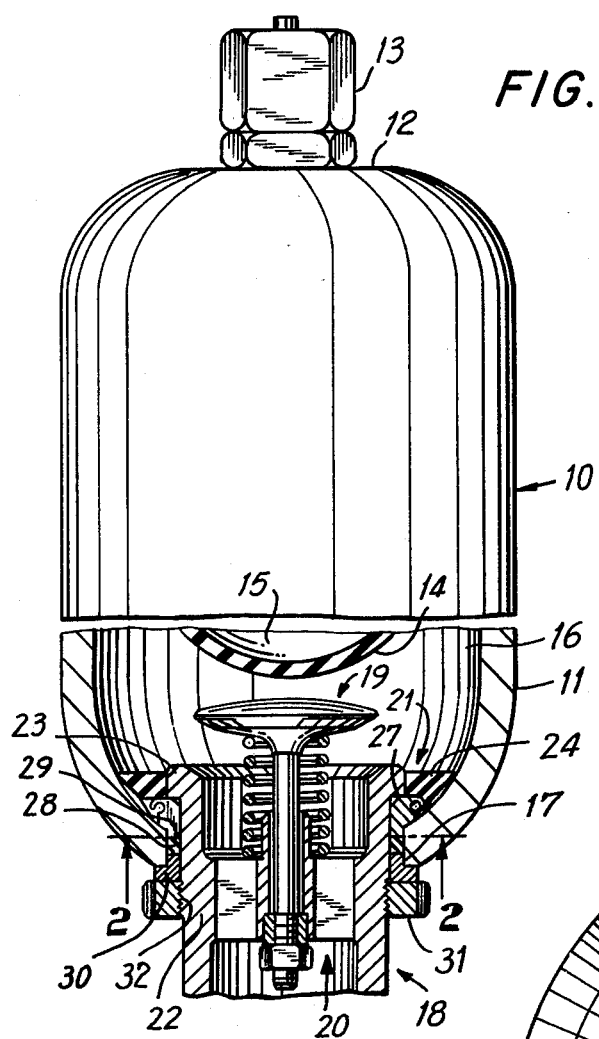
FIG. 1 is a side elevational view of a pressure vessel of the type described, partially in section.

Turning now to the drawings, an accumulator device 10, known per se, comprises a pressure vessel 11 having at its upper end 12 a gas charging valve 13 mounted in known manner in a gas charging port (not shown).

The pressure vessel includes a bladder 14 of elastomeric material disposed within the vessel to divide the same into two chambers, notably chamber 15 above the bladder and chamber 16 below the bladder.

The pressure vessel includes an oil port 17 at its lower end, leading to the chamber 16. A closure plug assembly 18, known per se, is mounted within the oil port 17. The closure plug assembly may include a valve assembly 19 which cooperates with the bladder 14 to open or close the passage 20 extending between the chamber 16 and an oil carrying conduit.

Since the interaction of the valve 19 and bladder 14 is conventional, further description thereof is unnecessary to an understanding of the present invention which is directed to the manner of forming the locking ring 21.

In advance of a specific discussion of the locking ring and method of manufacture thereof, it may be noted that the closure plug assembly 18 includes a generally cylindrical body 22 and an enlarged, radially extending flange 23, the flange and body being of lesser diameter than the oil port 17 whereby, for purposes of assembly, the plug may be readily passed upwardly into the interior of the chamber 16 through the port 17.

Figure 2:
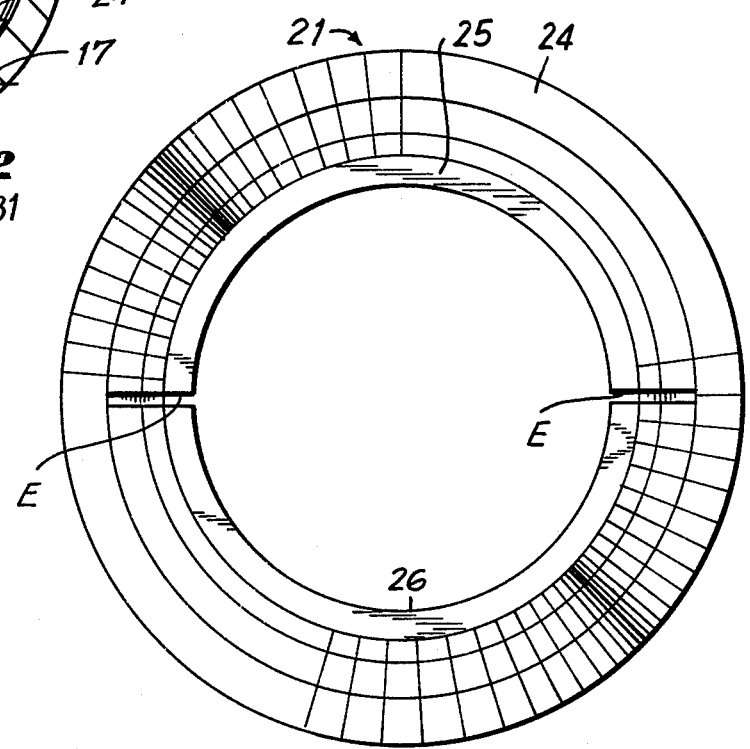
FIG. 2 is a magnified section taken on the line 2—2 of FIG. 1.

In order to lock the plug in the chamber 16, the locking ring assembly 21 incorporates an annular elastomeric ring portion 24 surrounding and retaining a pair of arcuate metallic segments 25, 26. It will be understood, as more particularly set forth in the above noted U.S. Pat. No. 3,733,682, that by virtue of the fact that each of the segments 25, 26 extends only substantially 180°, the locking ring may be folded about a fold line defined by the end portions E, E of the segments and passed upwardly through the oil port 18, whereupon the ring, when released, will spring back to its normal annular configuration, as shown in FIG. 2 for instance. When thus expanded, the previously inserted closure plug assembly may be seated with the enlarged flange 23 of the closure plug mounted against the upper shoulder 27 of the arcuate segments 25, 26.

In order to effect sealing, an O-ring or like gasket member 28 bears against the under surface 29 of the segments, and an annular flanged compression ring 30 is inserted into the oil port 17 to bear against the under surface of the O-ring or gasket 28.

A locking collar 31 is internally threaded complementally to the threading 32 on the exterior of the closure plug assembly 18, whereupon, on tightening of the collar, the flange 23 of the locking plug assembly is drawn tightly against the upper surface 27 of the segments of the locking ring assembly and the O-ring 28 is compressed between the upwardly urged compression ring 30 and the under surface of the segments 25, 26.

Figure 3:
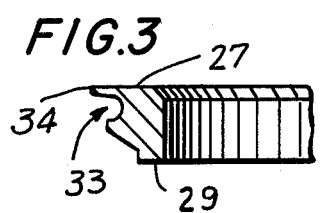
FIGS. 3, 4 and 5 are fragmentary vertical sectional views showing the sequence of formation of the locking ring.
Figure 4:
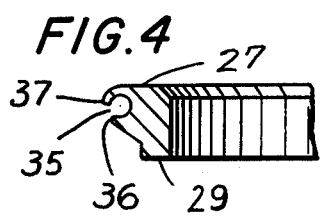

The locking ring assembly shown at 21 is, as previously noted, comprised of a pair of arcuate segments 25, 26. The segments 25, 26 initially are in the form of a continuous ring, a partial segment of which is shown in FIG. 3. As is apparent from such section, a continuous annular, outwardly facing groove 33 is formed about the periphery of the ring, the groove including a relatively thin, radially projecting lip 34.

In the next step in the manufacture of the device, the lip 34 is deformed downwardly so as to provide the groove 33 with a partially closed mouth portion 35 defined between the lower ledge 36 and the now depending free edge 37 of the lip 34. It will be noted that the mouth 35 defines a non-reentrant groove, i.e. the dimensions interiorly of the groove are larger than the transverse dimension of the mouth 35.

Figure 5:
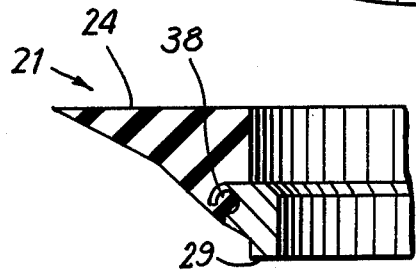

At this stage, an elastomeric material is molded in situ about the ring in the manner shown in FIG. 5. As is apparent, the elastomer will have entered the restricted mouth groove 33 and a bead 38 will have been formed within said groove. Since the dimensions of the bead are greater than the dimensions of the mouth 35, there is no possibility for the surrounding elastomer unseating from the ring.

The fabrication of the locking ring assembly is completed by sawing through the metal components of the ring, to divide the same into two segments of substantially 180° each, whereby the end portions E, E are formed. It will be appreciated that the sawing step, while completely penetrating the metallic ring, only partially severs the surrounding elastomeric components, whereby the segments 25, 26 are secured to the surrounding elastomeric material but are relatively foldable by deformation of the elastomeric material.

From the above it will be readily recognized that there is described an improved locking ring wherein the elements are interconnected permanently without the necessity for sandblasting and degreasing. There is further described a method whereby the improved locking ring may be formed by a series of steps which, as noted, obviates various cleaning and cementing procedures heretofore required.

Having thus described the invention and illustrated its use, what is claimed as new and is desired to be secured by Letters Patent is:

1. A locking ring assembly for retaining the closure plug of a hydraulic pressure accumulator device in the oil port of said device comprising, in combination, first and second arcuate metallic segments, said segments each encompassing an arc of substantially 180°, said segments being disposed in an essentially annular configuration, said segments including on their outer periphery a circumferential, outwardly facing groove, the groove portions of said segments being aligned to define an annulus, said groove portions, in transverse section, including an outwardly directed, restricted open mouth portion and a radially inwardly located recess, the transverse dimension of said recess being substantially greater than the transverse dimension of said mouth portion, whereby said groove portion defines a nonentrant configuration, the combination including a resilient, elastic, continuous annular retainer collar surrounding and molded in situ over said segments, said retainer collar including an integral annular bead portion filling said groove portions of said segments, said retainer collar maintaining said segments in said arcuate configuration.

2. A ring assembly in accordance with claim 1 wherein the portion of said groove between said mouth portion and recess defines a smooth, progressive inclination, thereby to facilitate the filling flow into said groove of the material from which said collar is molded.

3. A ring assembly in accordance with claim 2 wherein said mouth portion of said groove is formed from an integral lip on said segment which has been deflected toward a further portion of said segment.

* * * * *